(12) United States Patent
Zheng

(10) Patent No.: US 12,194,372 B2
(45) Date of Patent: Jan. 14, 2025

(54) METHOD OF OPERATING VIRTUAL CONTROLLER IN GAMING WATCH

(71) Applicant: Shenzhen Shimi Network Technology Co., Ltd., Shenzhen (CN)

(72) Inventor: Fang Zheng, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/888,841

(22) Filed: Aug. 16, 2022

(65) Prior Publication Data

US 2023/0173377 A1 Jun. 8, 2023

(30) Foreign Application Priority Data

Dec. 8, 2021 (CN) .......................... 202111493375.2

(51) Int. Cl.
*A63F 13/211* (2014.01)
*A63F 13/212* (2014.01)
*A63F 13/428* (2014.01)

(52) U.S. Cl.
CPC .......... *A63F 13/212* (2014.09); *A63F 13/211* (2014.09); *A63F 13/428* (2014.09)

(58) Field of Classification Search
CPC .... A63F 13/211; A63F 13/212; A63F 13/235; A63F 13/24; A63F 13/428; A63F 13/803; A63F 13/812; A63F 13/816; A63F 13/833; A63F 2300/1012; A63F 2300/1031; A63F 2300/105; A63F 2300/6045; A63F 2300/8005; A63F 2300/8011; A63F 2300/8017; A63F 2300/8029; G06F 3/014; G06F 3/017
See application file for complete search history.

(56) References Cited

U.S. PATENT DOCUMENTS

| | | | |
|---|---|---|---|
| 2014/0257534 A1* | 9/2014 | Morris | G06F 17/40 700/91 |
| 2014/0269225 A1* | 9/2014 | Ponsada | G04C 3/002 368/82 |
| 2016/0059120 A1* | 3/2016 | Komorous-King | A63F 13/211 463/36 |
| 2016/0370767 A1* | 12/2016 | Huang | G04B 47/06 |
| 2018/0338720 A1* | 11/2018 | Gupta | A61B 5/6824 |

* cited by examiner

*Primary Examiner* — David L Lewis
*Assistant Examiner* — Shauna-Kay Hall
(74) *Attorney, Agent, or Firm* — IPro, PLLC

(57) ABSTRACT

Disclosed herein is a method of operating a virtual controller in a gaming watch, comprising: by the virtual controller, receiving a wearer's gesture information including at least real-time spatial position data of a gyroscope, a real-time speed of current movement, an instantaneous turning speed, an instantaneous pitching speed and an instantaneous maximum speed; during continuous motion of the gyroscope, by the virtual controller, preprocessing the gesture information, and determining speed data generated by movement in a small range as "no real action" for removal; further processing valid data, including according to a configuration, dynamically generating specified grids to form a control panel of a virtual controller; moving a control object of the virtual controller; triggering determination result customized by the virtual controller; continuously adjusting a threshold, and converting the data; and identifying the data for display through an open source engine.

7 Claims, 1 Drawing Sheet

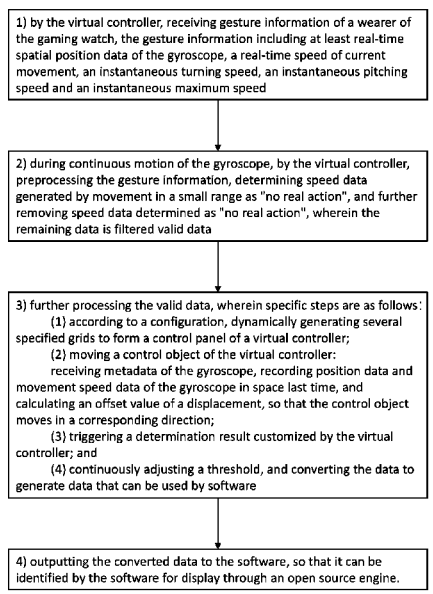

1) by the virtual controller, receiving gesture information of a wearer of the gaming watch, the gesture information including at least real-time spatial position data of the gyroscope, a real-time speed of current movement, an instantaneous turning speed, an instantaneous pitching speed and an instantaneous maximum speed

↓

2) during continuous motion of the gyroscope, by the virtual controller, preprocessing the gesture information, determining speed data generated by movement in a small range as "no real action", and further removing speed data determined as "no real action", wherein the remaining data is filtered valid data

↓

3) further processing the valid data, wherein specific steps are as follows:
    (1) according to a configuration, dynamically generating several specified grids to form a control panel of a virtual controller;
    (2) moving a control object of the virtual controller:
    receiving metadata of the gyroscope, recording position data and movement speed data of the gyroscope in space last time, and calculating an offset value of a displacement, so that the control object moves in a corresponding direction;
    (3) triggering a determination result customized by the virtual controller; and
    (4) continuously adjusting a threshold, and converting the data to generate data that can be used by software

↓

4) outputting the converted data to the software, so that it can be identified by the software for display through an open source engine.

METHOD OF OPERATING VIRTUAL CONTROLLER IN GAMING WATCH

TECHNICAL FIELD

The disclosure belongs to the technical field of computers, and relates to a software control program, in particular to a method for operating a virtual controller in a gaming watch.

BACKGROUND

There are two main solutions for gaming control in the current market: one is to operate characters in a game in the form of buttons; and the other is to operate the sensor control hardware with real actions, and simulate a motion trajectory of a gyroscope in the 3D space on the software, wherein the same actions of characters in an gaming App are realized through the optimization of a gyroscope algorithm.

1. Remote control somatosensory gaming solution: The gaming operations are realized through buttons of a remote control, but the defect is that it cannot achieve a real overall sense of motion.

2. Switch joy-con solution: The gaming operations are realized through the buttons and actions of a gamepad.

The defects are as follows. 1) Every time the game needs to implement a new action, the data of the gyroscope needs to be simulated and realized in 3D space. By continuously optimizing the algorithm of the hardware gyroscope and adjusting the threshold, the correct display of the real actions can finally be realized on the software. 2) The actions are highly repetitively developed, which wastes more time.

The problems that are difficult to overcome are as follows. 1) The processing of the gyroscope algorithm is difficult, it is difficult to achieve sufficient accuracy, and it is difficult to be universal. 2) The solution does not go beyond the thinking limit of copying from hardware actions to software actions.

SUMMARY

In an embodiment, a method of operating a virtual controller in a gaming watch with a gyroscope includes the following steps.
1) by the virtual controller, receiving gesture information of a wearer of the gaming watch, the gesture information including at least real-time spatial position data of the gyroscope, a real-time speed of current movement, an instantaneous turning speed, an instantaneous pitching speed and an instantaneous maximum speed;
2) during continuous motion of the gyroscope, by the virtual controller, preprocessing the gesture information, determining speed data generated by movement in a small range as "no real action", and further removing the speed data determined as "no real action", wherein the remaining data is filtered valid data;
3) further processing the valid data, wherein specific steps are as follows:
    (1) according to the configuration, dynamically generating several specified grids to form a control panel of a virtual controller;
    (2) moving a control object of the virtual controller: receiving metadata of the gyroscope, recording position data and movement speed data of the gyroscope in space last time, and calculating an offset value of a displacement, so that the control object moves in a corresponding direction;
    (3) triggering a determination result customized by the virtual controller; and
    (4) continuously adjusting a threshold, and converting the data to generate data that can be used by software; and
    4) outputting the converted data to the software, so that it can be identified by the software for display through an open source engine.

In the above method, in step 1), the real-time spatial position data of the gyroscope includes a current x-coordinate value and y-coordinate value.

In the above method, in step 2), speed data with the real-time speed less than 400 mm/s is set as the speed data generated by the movement in a small range.

In the above method, in (1) of step 3), the control panel generates a rectangular array, a horizontal arrangement or a vertical arrangement according to requirements of the virtual controller.

In the above method, in (3) of step 3), the customized determination result includes at least boxing, table tennis, basketball, racing, running, swimming and rowing.

In the above method, a technical platform of the virtual controller is Cocos Creator 2.4.5; and a technical language of the virtual controller is typescript.

In the above method, the virtual controller has a Bluetooth transmission port, and the gesture information is received through the Bluetooth transmission port.

In the above method, the gaming watch is further provided with an electronic watch display screen.

Compared with the prior art, the method of operating the virtual controller in the gaming watch has the following beneficial effects.

1. The virtual controller can quickly identify various actions of the gyroscope, and output the actions and apply them to the game.

2. Multi-action identification in the game can realized through multiple sets of controllers.

3. The virtual controller is applied to a variety of gaming action scenes, which overcomes the problem of the accuracy of the gyroscope algorithm and achieves a relatively good implementation effect.

4. As a standardized platform, the virtual controller can output to the outside.

BRIEF DESCRIPTION OF FIGURES

FIG. 1 is a flowchart showing a method according to an embodiment.

DETAILED DESCRIPTION

Specific implementations of the present invention will be further explained in the following specific embodiments.

As shown in FIG. 1, a gaming watch is provided with a gyroscope and a virtual controller. A method of operating the virtual controller in the gaming watch comprises the following steps:
1) by the virtual controller, receiving gesture information of a wearer of the gaming watch, the gesture information including at least real-time spatial position data of the gyroscope, a real-time speed of current movement, an instantaneous turning speed, an instantaneous pitching speed and an instantaneous maximum speed,
wherein the real-time spatial position data of the gyroscope includes a current x-coordinate value and y-coordinate value;

2) during continuous motion of the gyroscope, by the virtual controller, preprocessing the gesture information, setting speed data with the real-time speed less than 400 mm/s as speed data generated by movement in a small range, determining speed data generated by the movement in the small range as "no real action", and further removing the speed data determined as "no real action", wherein the remaining data is filtered valid data;

3) further processing the valid data, wherein specific steps are as follows:
   (1) according to the configuration, dynamically generating several specified grids to form a control panel of a virtual controller,
      wherein the control panel generates a rectangular array, a horizontal arrangement or a vertical arrangement according to requirements of the virtual controller;
   (2) moving a control object of the virtual controller:
      receiving metadata of the gyroscope, recording position data and movement speed data of the gyroscope in space last time, and calculating an offset value of a displacement, so that the control object moves in a corresponding direction;
   (3) triggering a determination result customized by the virtual controller,
      wherein the customized determination result includes at least boxing, table tennis, basketball, racing, running, swimming and rowing; and
   (4) continuously adjusting a threshold, and converting the data to generate data that can be used by software; and 4) outputting the converted data to the software, so that it can be identified by the software for display through an open source engine.

For example, for a forehand draw of table tennis, in the virtual controller, by simulating the action of table tennis in reality, when the offset value reaches 120, a notification of the forehand draw action event will be issued. The notification of the action event can be transmitted to the game in real time, and real-time action feedback can be obtained in the game to realize real-time interaction in the game.

A technical platform of the virtual controller is Cocos Creator 2.4.5; and a technical language of the virtual controller is typescript.

The virtual controller has a Bluetooth transmission port, and the gesture information is received through the Bluetooth transmission port.

The gaming watch is further provided with an electronic watch display screen.

Compared with the prior art, the method of operating the virtual controller in the gaming watch has the following beneficial effects:

1. The virtual controller can quickly identify various actions of the gyroscope, and output the actions and apply them to the game.

2. Multi-action identification in the game can realized through multiple sets of controllers.

3. The virtual controller is applied to a variety of gaming action scenes, which overcomes the problem of the accuracy of the gyroscope algorithm and achieves a relatively good implementation effect.

4. As a standardized platform, the virtual controller can be output to the outside.

The application of the virtual controller in the gaming watch is a groundbreaking technical solution. At present, the game industry does not use this technology to realize the operations on the characters in the game by watch hardware.

The real action of the watch can be more accurately identified through the virtual controller, which greatly reduces misoperation and enhances the gaming experience.

Of course, the above description is not intended to limit the present invention, and the present invention is not limited to the above examples. Changes, modifications, additions or replacements made by those skilled in the art within the essential scope of the present invention should also belong to the scope of protection of the present invention.

What is claimed is:

1. A method of operating a virtual controller in a gaming watch, wherein the gaming watch is provided with a gyroscope and the virtual controller, the method comprising the following steps:
   1) by the virtual controller, receiving gesture information of a wearer of the gaming watch, the gesture information including at least real-time spatial position data of the gyroscope, a real-time speed of current movement, an instantaneous turning speed, an instantaneous pitching speed and an instantaneous maximum speed;
   2) during continuous motion of the gyroscope, by the virtual controller, preprocessing the gesture information, determining speed data generated by movement in a small range as "no real action", and further removing speed data determined as "no real action", wherein the remaining data is filtered valid data;
   3) further processing the valid data, wherein specific steps are as follows:
      (1) according to a configuration, dynamically generating several specified grids to form a control panel of a virtual controller;
      (2) moving a control object of the virtual controller:
         receiving metadata of the gyroscope, recording position data and movement speed data of the gyroscope in space last time, and calculating an offset value of a displacement, so that the control object moves in a corresponding direction;
      (3) triggering a determination result customized by the virtual controller; and
      (4) continuously adjusting a threshold, and converting the data to generate data that can be used by software; and
   4) outputting the converted data to the software, so that it can be identified by the software for display through an open source engine.

2. The method of claim 1, wherein in step 1), the real-time spatial position data of the gyroscope includes a current x-coordinate value and y-coordinate value.

3. The method of claim 1, wherein in step 2), speed data with the real-time speed less than 400 mm/s is set as the speed data generated by the movement in the small range.

4. The method of claim 1, wherein in (1) of step 3), the control panel generates a rectangular array, a horizontal arrangement or a vertical arrangement according to requirements of the virtual controller.

5. The method of claim 1, wherein in (3) of step 3), the customized determination result includes at least boxing, table tennis, basketball, racing, running, swimming and rowing.

6. The method of claim 1, wherein a technical platform of the virtual controller is Cocos Creator 2.4.5; and a technical language of the virtual controller is typescript.

7. The method of claim 1, wherein the virtual controller has a Bluetooth transmission port, and the gesture information is received through the Bluetooth transmission port.

* * * * *